April 24, 1928.  E. WILDHABER  1,667,299

GEAR CUTTER

Filed March 16, 1927

INVENTOR
Ernest Wildhaber
BY
ATTORNEY

Patented Apr. 24, 1928.

1,667,299

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

GEAR CUTTER.

Application filed March 16, 1927. Serial No. 175,859.

The present invention relates to gear cutters for cutting longitudinally curved tooth gears and particularly to gear cutters of the general type described in U. S. Letters Patent No. 1,236,834, granted to James E. Gleason, August 14, 1917.

The primary object of this invention is to provide a cutting blade which will have two side cutting edges capable of simultaneously finish cutting two adjacent side tooth faces of a longitudinally curved tooth gear. Otherwise stated, the present invention has for its purpose to provide a form of cutting blade, adapted for cutting spiral or longitudinally curved tooth gears, which will have two side cutting edges each capable of taking a smooth cut on a tooth surface of a gear blank during the curvilinear movement of the blade.

The cutter commonly employed in cutting curved tooth gears two side faces simultaneously has finish side cutting edges on alternate blades. The blades are provided with a side rake, alternate blades having the side rake extending in opposite directions, thus throwing the finish cutting edge to opposite sides of alternate blades. The cutting edges of the blades of this form of cutter lie in planes which pass through the cutter axis and are perpendicular to the face of the cutter head.

It has also been proposed to make the cutting blades without side rake and provide two cutting edges on each blade. Here again the cutting edges lie in planes perpendicular to the face of the cutter head. The cutting action of blades constructed in the manner last described, however, is poor and the tooth surface finish is not smooth.

The purpose of the present invention is to provide a form of cutter blade which may have two finish side cutting edges and still cut as smoothly as do cutters constructed according to the first form described. The aim of this invention, hence, is to provide a gear cutter which will speed up production while at the same time cutting tooth surfaces of the desired quality.

In the preferred form of this invention, the cutting blades are provided with a front rake, that is, the cutting edges are inclined rearwardly from the tip or end of the cutting portion of the blade to the body portion thereof. This will give each side cutting edge of the blade a good cutting action and each side cutting edge may become therefore, a finish side cutting edge, thereby multiplying by two the number of finish side cutting edges which it is possible to place upon a cutter head. In a modification of this invention, the tool is not only provided with a front rake, but its front face is concaved from side to side. If the concavity of the front face is kept within reasonable limits, it has been found that this defines the side cutting edges more sharply and makes their cutting action keener. Both modifications are shown in the accompanying drawings. It will be understood, however, that the invention is capable of further modification within its scope and the limits of the appended claims.

Figure 1:
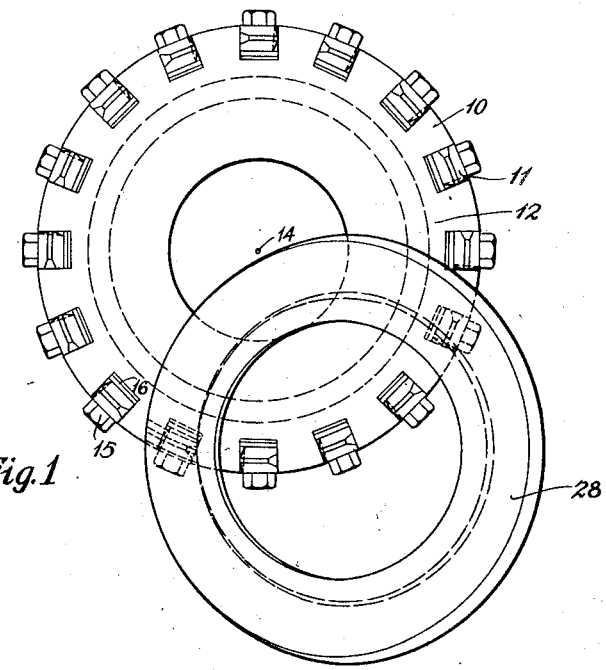
Figures 1 and 2 are a plan view and side elevation, respectively, showing the relative positions of a cutter constructed according to the preferred embodiment of my invention and a tapered gear blank during the cutting operation.
Figure 2:
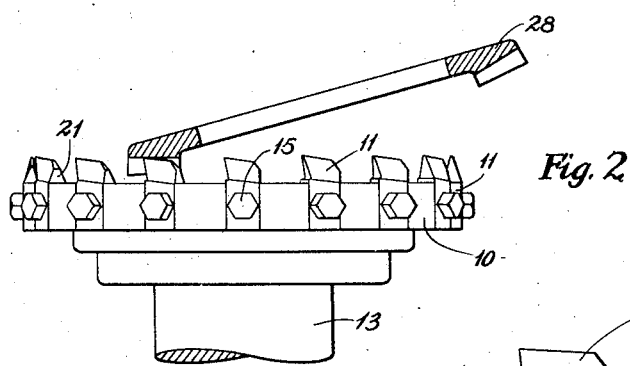

In Figures 1 and 2, a rotary annular face mill 10, such as is commonly employed in cutting spiral or longitudinally curved tooth gears, is shown provided with a plurality of cutting blades 11 constructed according to this invention. The face mill has a head or support 12 which is adapted to be mounted upon a spindle 13 and rotates about the axis 14 of this spindle. The periphery of the head is recessed at intervals to receive the cutting blades 11 which are held in place on the head by means of set screws 15. Ordinarily, shims 16 will be provided to permit of adjusting the blades radially of the axis of the head.

Each of the blades comprises a body portion 17 which is secured to the cutter head and a cutting portion 18 on which the cutting edges are formed. The cutting portion 18 comprises a front face 19, two side faces 20, a back face 21 and an end or top face 22.

The cutting portion is provided with a front rake or hook, that is, the front face 19 is inclined rearwardly from the end or tip 22 to the body portion 17. The front face 19 forms with the side faces 20 two side cutting edges 24 and with the end face 22, an end cutting edge 25.

Each of the side cutting edges 24 is inclined rearwardly from the end cutting edge 25. When assembled on the cutter head, the cutting edges lie in a plane which is inclined to the face of the cutter head.

When a cutting blade is constructed in the manner described, each of the side cutting edges will take a clean, sharp cut. Consequently, each blade may have two side finish cutting edges, each capable of cutting a tooth surface of the blank with the required smoothness.

The sides 20 are curved longitudinally from front to back and relieved with reference to the front cutting edges to provide the necessary clearance for the cutting edges during the cut. Similarly, the end face 22 is relieved with reference to the end cutting edge 25. The side cutting faces may be relieved on any desired curve. In practise, the side cutting faces are of helical form with reference to the rotary axis 14 of the cutter head.

Figures 3, 4, 5, 6:
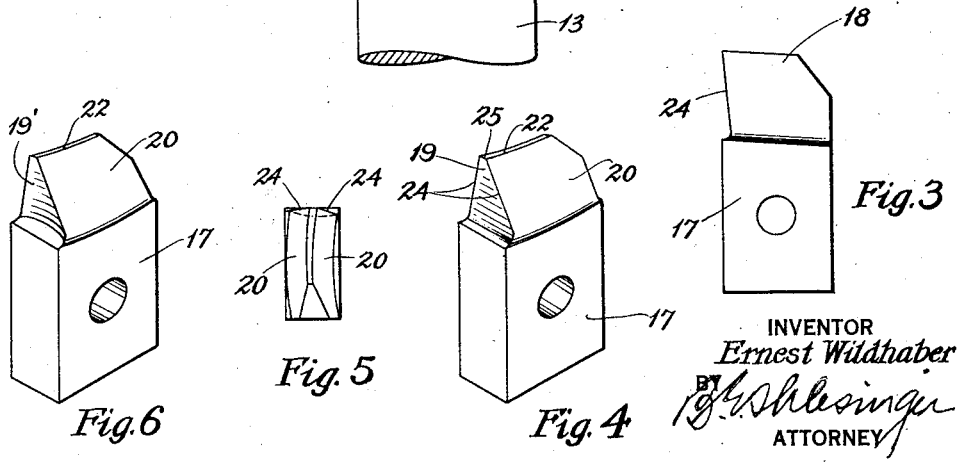
Figure 3 is an enlarged side view of one of the cutting blades.
Figure 4 is a perspective view of one form of blade constructed according to this invention.
Figures 5 and 6 are a plan or end view and a perspective view, respectively, showing a modified form of cutting blade constructed according to this invention.

The front face 19 of the cutting portion may be a plane, as shown in Figure 4, or a concave surface as shown in Figures 5 and 6 at 19′. In certain cases, the latter form will give better results, as the concavity of the front face sharply defines the side cutting edges 24 and improves their cutting action. Where the front face is made concave, the cutting portion will be provided, preferably nonetheless, with a front rake as before. In either modification, the front face of the blade will be inclined preferably in such manner that either the two end points of the side cutting edges or the two points in the two side cutting edges which operate at the pitch lines of the tooth faces of the gear blank lie in a line extending radially from the axis of the cutter head.

In Figures 1 and 2, a face mill 10, constructed according to this invention, is shown in cutting engagement with a tapered gear blank 28. As the face mill rotates on its axis, the cutting edges will move in a circle, each blade being brought successively into cutting engagement with the blank and each cutting blade will take simultaneously a finishing cut upon the two adjacent side tooth faces of the blank defining a groove thereof. With this invention, the cutting operation can be completed more rapidly, while meeting present day requirements as to smoothness and quality of tooth surface finish.

A cutter constructed according to the present invention will preferably be employed as a finishing tool, operating upon a blank which has been previously roughed out, though, if desired, the cutter may be used to rough out and finish cut. Gears may be cut in a generating or non-generating (formed) operation with a tool constructed according to this invention. The side cutting edges may be made straight or curved, as required. The cutting edges, will of course, have a pressure angle determined by the usual methods.

Tools constructed according to this invention may be employed in cutting longitudinally curved tooth spur gears, as well as longitudinally curved tooth tapered gears, both bevel and hypoid.

While the invention has been shown as applied to a rotary annular face mill, it will be understood, that the tool might be a face hobbing cutter in which the blades are so arranged as to cut in successive tooth spaces of the blank.

The invention is capable of further modification also. In general, it may be said, that this application is intended to cover any variations, uses, or adaptations of my invention, following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. A gear cutter blade having a cutting portion provided with front, end, side, and back faces, the front face being concave and forming with the side faces and end face two side and an end cutting edge, said side faces being curved longitudinally from front to back, said side faces and end face being relieved with reference to said cutting edges.

2. A gear cutter blade comprising a body portion and a cutting portion, said cutting portion being provided with front, end, side and back faces, the front face being inclined rearwardly from the end face to said body portion and forming with the side faces and end face two rearwardly inclined side cutting edges and an end cutting edge, said side faces being curved longitudinally from front to back, and said side faces and end face being relieved with reference to said cutting edges.

3. A gear cutter blade comprising a body portion and a cutting portion, said cutting portion being provided with front, end, side and back faces, said front face being concave and inclined rearwardly from the end face to said body portion and forming with the side faces and end face, a pair of rearwardly inclined side cutting edges and an end cutting edge, said side faces being curved longitudinally from front to back, said side faces and end face being relieved with reference to said cutting edges.

4. A gear cutter comprising a head adapted to be rotated and carrying a plurality of cutting blades, each of said cutting blades having a cutting portion projecting from said head in the general direction of the axis of said head and provided with front, end, side and back faces, the front face being concave from side to side and forming with the side faces and end face a pair of side cutting edges and an end cutting edge, said side faces being curved longitudinally from front to back and said side faces and end face being relieved with reference to said cutting edges.

5. A gear cutter comprising a head adapted to be rotated and carrying a plurality of cutting blades, each of said cutting blades having a cutting portion projecting from said head in the general direction of the axis of said head and provided with front, end, side and back faces, said front face being inclined to said head and forming with said end and side faces an end cutting edge and two side cutting edges, said side faces being curved longitudinally from front to back and said side and end faces being relieved with reference to said cutting edges.

6. A gear cutter comprising a head adapted to be rotated and carrying a plurality of cutting blades, each of said cutting blades having a cutting portion projecting from said head in the general direction of the axis of said head and provided with front, end, side and back faces, said front face being concave from side to side and inclined rearwardly from the end face and forming with said sides and end faces an end cutting edge and two side cutting edges, said side faces being curved longitudinally from front to back and said side and end faces being relieved with reference to said cutting edges.

7. A gear cutter blade provided with front, side, end, and back faces, the front face being inclined rearwardly from the end face and forming with a side face a side cutting edge, said side face being curved longitudinally from front to back and being relieved with reference to said side cutting edge.

8. A gear cutter blade provided with front, side, end and back faces, the front face being concave from side to side, forming with a side face a side cutting edge, said side face being curved longitudinally from front to back and being relieved with reference to said side cutting edge.

9. A gear cutter blade having a cutting portion provided with front, end, side and back faces, said side faces being curved longitudinally from front to back, said front face forming an acute angle with each side face to provide inside and outside finish cutting edges, said side faces being relieved with reference to said finish cutting edges.

10. A gear cutter blade comprising a body portion and a cutting portion, said cutting portion being provided with front, end, side and back faces, the front face being inclined rearwardly from the end face to said body portion and forming an acute angle with each side face to provide inside and outside finish cutting edges, said side faces being curved longitudinally from front to back and being relieved with reference to said finish cutting edges.

11. A gear cutter comprising a head adapted to be rotated and carrying a plurality of cutting blades, each of said cutting blades having a cutting portion projecting from said head in the general direction of the axis of said head, said cutting portions being provided with front, end, side and back faces, the front face of each blade forming an acute angle with its side faces, whereby each blade is provided with inside and outside finish cutting edges, the side faces of each blade being relieved with reference to its finish cutting edges, said blades being of equal width in a plane perpendicular to the axis of the tool and corresponding side cutting edges of the blades being equally inclined to said plane.

12. A gear cutter comprising a head adapted to be rotated and carrying a plurality of cutting blades, each of said cutting blades having a cutting portion projecting from said head in the general direction of the axis of said head, said cutting portions being provided with front, end, side, and back faces, the front face of each blade forming an acute angle with its side faces, whereby each blade is provided with inside and outside finish cutting edges, the side faces of each blade being relieved with reference to said finish cutting edges, said blades being of equal width in a plane perpendicular to the axis of the tool and corresponding side cutting edges of said blades being equally inclined to said plane, each of said blades being so positioned on the head that a line drawn radially from the axis of the head will contain points on the opposite side cutting edges.

13. A gear cutter comprising a head adapted to be rotated and carrying a plurality of cutting blades, each of said cutting blades having a cutting portion projecting from said head in the general direction of the axis of said head, said cutting portions being provided with front, end, side and back faces, the front face of each blade being inclined rearwardly from its end face to said head and forming an acute angle with its side faces whereby each blade is provided with inside and outside finish cutting edges, the side faces of each blade being relieved with reference to its finish cutting edges, said blades being of equal width in a plane perpendicular to the axis of the tool and corresponding side cutting edges of the blades being equally inclined to said plane.

14. A gear cutter comprising a head adapted to be rotated and carrying a plurality of cutting blades, each of said cutting blades having a cutting portion projecting from said head in the general direction of the axis of said head, said cutting portions being provided with front, end, side and back faces, the front face of each blade being inclined rearwardly from its end face to said head and forming an acute angle with its side faces whereby each blade is provided with inside and outside finish cutting edges, the side faces of each blade being relieved with reference to said finish cutting edges, said blades being of equal width in a plane perpendicular to the axis of the tool and corresponding side cutting edges being equally inclined to said plane, each blade being so positioned on the head that a line drawn radially from the axis of the head will contain points on the opposite side cutting edges.

15. A gear cutter comprising a head adapted to be rotated and carrying a plurality of cutting blades, each of said cutting blades having a cutting portion projecting from said head in the general direction of the axis of said head and provided with front, end, side, and back faces, the front face of each blade being concave from side to side and forming with the side faces and end face a pair of side cutting edges and an end cutting edge, said side faces and end face being relieved with reference to said cutting edges, each of said blades being of equal width in a plane perpendicular to the axis of the tool and corresponding side cutting edges of the blades being equally inclined to said plane.

16. A gear cutter comprising a head adapted to be rotated and carrying a plurality of cutting blades, each of said cutting blades having a cutting portion projecting from said head in the general direction of the axis of said head and provided with front, end, side, and back faces, said front face being inclined to said head and forming with said head and side faces an end cutting edge and two side cutting edges, said side and end faces being relieved with reference to said cutting edges, said blades being of equal width in a plane perpendicular to the axis of the tool and corresponding side cutting edges of the blades being equally inclined to said plane.

17. A gear cutter comprising a head adapted to be rotated and carrying a plurality of cutting blades, each of said cutting blades having a cutting portion projecting from said head in the general direction of the axis of said head and provided with front, end, side, and back faces, said front face being concave from side to side and inclined rearwardly from the end face and forming with said side and end faces an end cutting edge and two side cutting edges, said side and end faces being relieved with reference to said cutting edges, said blades being of equal width in a plane perpendicular to the axis of the tool and corresponding side cutting edges of the blades being equally inclined to said plane.

18. A gear cutter comprising a head adapted to be rotated and carrying a plurality of cutting blades, each of said cutting blades having a cutting portion projecting from said head in the general direction of the axis of said head and provided with front, end, side, and back faces, said front face being concave from side to side and forming with the side faces and end face a pair of side cutting edges and an end cutting edge, each of said blades being so positioned on the head that a line drawn radially from the axis of the head will contain points on opposite side cutting edges, said blades being of equal width in a plane perpendicular to the axis of the tool and corresponding side cutting edges of the blades being equally inclined to said plane.

19. A gear cutter comprising a head adapted to be rotated and carrying a plurality of cutting blades, each of said cutting blades having a cutting portion projecting from said head in the general direction of the axis of said head and provided with front, end, side and back faces, said front face being inclined rearwardly from said end face toward said head and forming with the side faces and end face a pair of side cutting edges and an end cutting edge, each of said blades being so positioned on the head that a line drawn radially from the axis of the head will contain points on opposite side cutting edges, said blades being of equal width in a plane perpendicular to the axis of the tool and corresponding side cutting edges of the blades being equally inclined to said plane.

20. A gear cutter comprising a head adapted to be rotated and carrying a plurality of cutting blades, each of said cutting blades having a cutting portion projecting from said head in the general direction of the axis of said head and provided with front, end, side, and back faces, said front face being concave from side to side and inclined rearwardly from the end face toward said head and forming with the side faces and end face a pair of side cutting edges and an end cutting edge, each of said blades being so positioned on the head that a line drawn radially from the axis of the head will contain points on the opposite side cutting edges, said blades being of equal width in a plane perpendicular to the axis of the head and corresponding side cutting edges of the blades being equally inclined to said plane.

ERNEST WILDHABER.